US009958285B2

(12) United States Patent
Lee et al.

(10) Patent No.: US 9,958,285 B2
(45) Date of Patent: May 1, 2018

(54) METHOD OF ACQUIRING IMAGE AND ELECTRONIC DEVICE THEREOF

(71) Applicant: Samsung Electronics Co., Ltd., Gyeonggi-do (KR)

(72) Inventors: Shin-Jun Lee, Gyeonggi-do (KR); K Santle Camilus, Gyeonggi-do (KR); Sumedh Mannar, Gyeonggi-do (KR); Vijay A, Gyeonggi-do (KR); Moo-Jung Kim, Seoul (KR); Amit Kumar, Gyeonggi-do (KR); Sung-Dae Cho, Gyeonggi-do (KR); Pankaj Kumar Bajpai, Gyeonggi-do (KR); Piyush Gupta, Gyeonggi-do (KR); Rahul Chouhan, Gyeonggi-do (KR); Hyung-Suk Kim, Gyeonggi-do (KR); Ki-Huk Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 322 days.

(21) Appl. No.: 14/626,982

(22) Filed: Feb. 20, 2015

(65) Prior Publication Data

US 2015/0233724 A1 Aug. 20, 2015

(30) Foreign Application Priority Data

Feb. 20, 2014 (IN) .............................. 820/CHE/2014
Feb. 21, 2014 (KR) ........................ 10-2014-0020406

(51) Int. Cl.
*G01C 21/00* (2006.01)
*G01C 21/36* (2006.01)
(Continued)

(52) U.S. Cl.
CPC ........... *G01C 21/36* (2013.01); *G01C 21/367* (2013.01); *G06F 17/30241* (2013.01); *G06K 9/00664* (2013.01); *G06T 2207/30244* (2013.01)

(58) Field of Classification Search
CPC ........... H04N 1/00183; H04N 2101/00; H04N 5/23206; H04N 21/4781; H04N 5/23293;
(Continued)

(56) References Cited

U.S. PATENT DOCUMENTS 8,600,194 B2 * 12/2013 Doepke ......................... 382/294
8,655,620 B2 * 2/2014 Chen et al. ................... 702/141
(Continued)

FOREIGN PATENT DOCUMENTS

KR 10-2012-0074493 A 7/2012

*Primary Examiner* — Frank Huang
(74) *Attorney, Agent, or Firm* — Cha & Reiter, LLC

(57) ABSTRACT

An electronic device and method for capturing an image are disclosed. The electronic device includes an image sensor configured to capture images, a location sensor configured to detect a location of the electronic device, and a processor. The processor may execute the method, which includes capturing a first image, and detecting a first location where the first image is captured, detecting, by a processor, a second location at which a second image is to be captured and generating guidance information for travel to the second location, and when a present location is within a predefined range of the second location, automatically capturing the second image.

20 Claims, 15 Drawing Sheets

(51) Int. Cl.
*G06K 9/00* (2006.01)
*G06F 17/30* (2006.01)

(58) Field of Classification Search
CPC ......... H04N 5/23238; H04N 21/41407; H04N 21/4223; H04N 5/23216; G06T 3/4038
See application file for complete search history.

(56) References Cited

U.S. PATENT DOCUMENTS

| | | | |
|---|---|---|---|
| 8,773,502 B2* | 7/2014 | Rapoport et al. | 348/36 |
| 8,902,335 B2* | 12/2014 | Doepke et al. | 348/239 |
| 8,933,986 B2* | 1/2015 | Schall et al. | 348/37 |
| 8,941,716 B2* | 1/2015 | Matsumoto et al. | 348/36 |
| 8,957,944 B2* | 2/2015 | Doepke et al. | 348/36 |
| 9,723,203 B1* | 8/2017 | Ettinger | H04N 5/23222 |
| 2008/0118184 A1* | 5/2008 | Panabaker et al. | 382/294 |
| 2011/0234750 A1* | 9/2011 | Lai et al. | 348/37 |
| 2012/0099804 A1 | 4/2012 | Aguilera et al. | |

* cited by examiner

METHOD OF ACQUIRING IMAGE AND ELECTRONIC DEVICE THEREOF

CROSS REFERENCE TO RELATED APPLICATION(S)

This application claims the benefit under 35 U.S.C. § 119(a) of an Indian patent application filed on Feb. 20, 2014 in the Intellectual Property of India and assigned Serial number 820/CHE/2014, and a Korean patent application filed in the Korean Intellectual Property Office on Feb. 21, 2014 and assigned Serial No. 10-2014-0020406, the entire disclosure of each of which is hereby incorporated by reference.

TECHNICAL FIELD

The present disclosure relates to an electronic device, and more particularly, to an electronic device and method for acquiring an image.

BACKGROUND

Nowadays, electronic devices capable of performing multiple complex tasks have gradually increased. Moreover, mobile terminal electronic device such as a so-called 'smart phone' sees widespread use. Such a mobile terminal typically includes a display module having a large screen and is capable of receiving touch inputs, in addition to high resolution camera module. In addition, basic traditional functions have been retained, such as communicating with another party, which may thus compliment the functionality of a device capable of capturing photographs and videos and other media. Further, the mobile terminal may playback multimedia content, such as music and video, and further access and navigate the web via network connection. The mobile terminal typically includes a high performance processor, facilitating the execution of all of these functions.

Modern day electronic devices may generate or store a wide variety of data. For example, the electronic device is capable of generating images using a camera function.

When certain conditions are satisfied, the electronic device may acquire and store an image, or a plurality of images via the camera function. The general operation of the camera function may include detecting an input such as activation of a key, a touch input, a voice instruction, a gesture input, and then determine the input indicates triggering acquisition of an image by the camera function.

Further, the electronic device may further utilize a set time or timer information to capture an image, and thereby capture an image at or on expiration of a predetermined time interval.

In order to capture an image of different locations, the electronic device is manually actuated by the user at different locations to capture the images. Because an image are captured according to the user inputs, it is possible that an unnecessary or unintended image may be captured.

SUMMARY

Accordingly, an aspect of the present disclosure is to provide a device and method for automatically acquiring an image based on moving information from a previous location to a present location of an electronic device.

In one aspect of this disclosure, a method of acquiring an image in an electronic device is disclosed, including capturing a first image, and detecting a first location where the first image is captured, detecting, by a processor, a second location at which a second image is to be captured and generating guidance information for travel to the second location, and when a present location is within a predefined range of the second location, automatically capturing the second image.

In one aspect of this disclosure, an electronic device is disclosed, including an image acquisition module configured to capture image, a location sensor configured to detect a location of the electronic device, and a processor, which may be configured to capture a first image using the image acquisition module, and detect a first location where the first image is captured using the location sensor, detect a second location where a second image is to be captured and generating guidance information for travel to the second location, and when a present location is within a predefined range of the second location, automatically capture the second image with the image acquisition module.

In one aspect of this disclosure, a computer readable recording medium on which a program is stored is disclosed, the program executable by a processor to capture a first image, and detecting a first location where the first image is captured, detect, by a processor, a second location at which a second image is to be captured and generating guidance information for travel to the second location, and when a present location is within a predefined range of the second location, automatically capture the second image.

In accordance with an aspect of the present disclosure, a method of acquiring an image in an electronic device includes: determining a first location corresponding to a first image stored at the electronic device; determining moving information from the first location to a second location of the electronic device; and automatically acquiring a second image corresponding to the second location, when the moving information belongs to a specified range.

In accordance with another aspect of the present disclosure, an electronic device includes: a location determination module that determines a first location corresponding to a first image stored at the electronic device; a moving information module that determines moving information from the first location to a second location of the electronic device; and an image acquisition module that automatically acquires a second image corresponding to the second location, when the moving information belongs to a specified range.

In accordance with another aspect of the present disclosure, there is provided a computer readable recording medium on which a program for executing operation of determining a first location corresponding to a first image stored at an electronic device, operation of determining moving information from the first location to a second location of the electronic device, and operation of automatically acquiring a second image corresponding to the second location when the moving information belongs to a specified range is recorded.

BRIEF DESCRIPTION OF THE DRAWINGS

The above and other aspects, features and advantages of certain example embodiments of the present disclosure will be more apparent from the following detailed description taken in conjunction with the accompanying drawings, in which.

DETAILED DESCRIPTION

Figure 1:
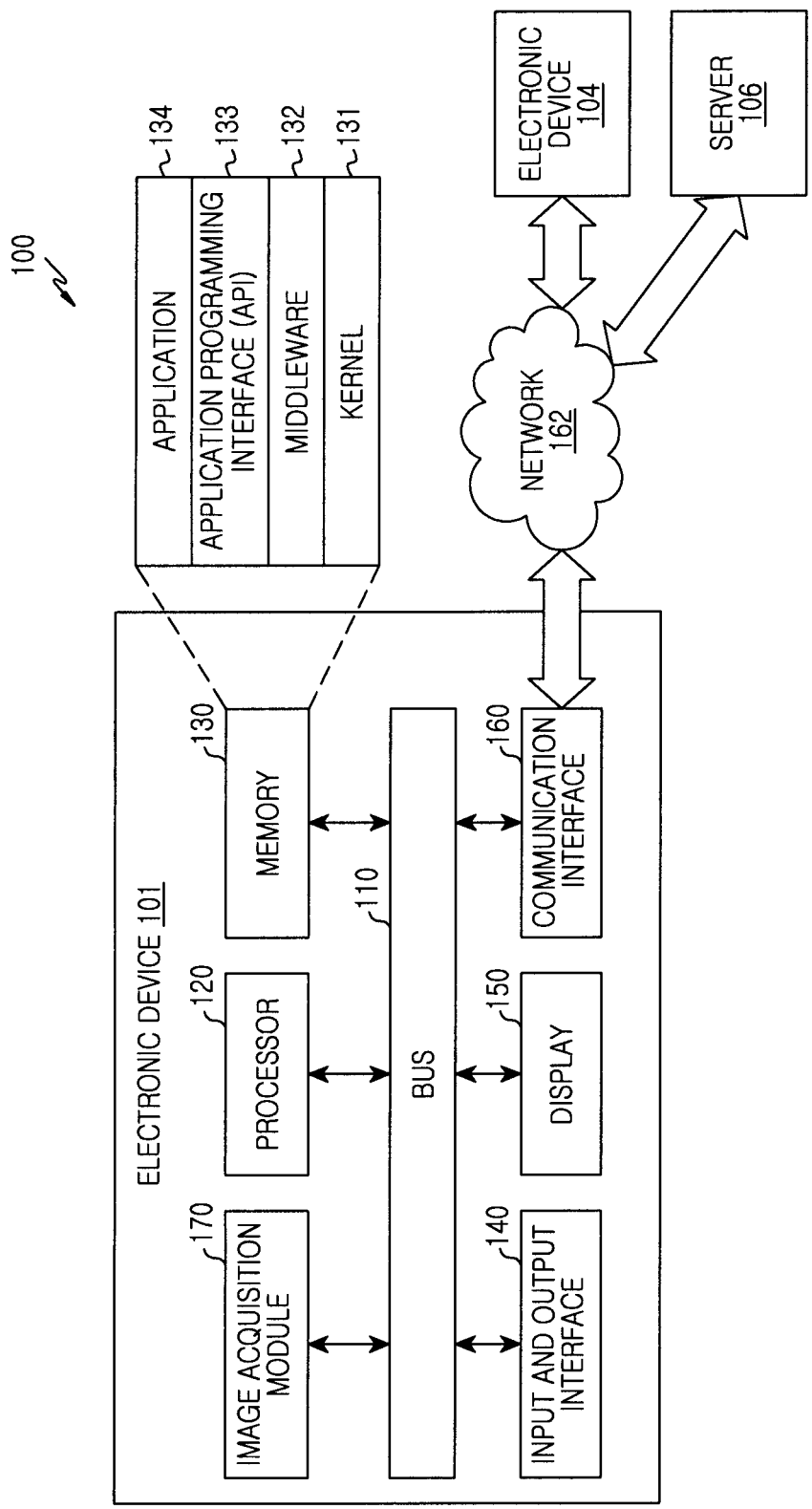
FIG. 1 is a diagram illustrating a network environment including an electronic device according to various example embodiments of the present disclosure.

Hereinafter, example embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the disclosure and is not intended to limit the disclosure to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of "first", "second", "primary", and "secondary" in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first element may be referred to as a second element without deviating from the scope of the present disclosure, and similarly, a second element may be referred to as a first element.

When it is described that an element is "connected" or "electrically connected" to another element, the element may be "directly connected" or "directly electrically connected" to the other element or may be "connected" or "electrically connected" to the other element through a third element. However, when it is described that an element is "directly connected" or "directly electrically connected" to another element, no element may exist between the element and the other element.

Terms used in the present disclosure are not to limit the present disclosure but to illustrate a specific example embodiment. When using in a description of the present disclosure and the appended claims, a singular expression includes a plurality of expressions unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

An electronic device according to the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MPEG 3 (MP3) player, a mobile medical equipment, a camera (e.g., an image sensor), or a wearable device (e.g., Head-Mounted-Device (HMD) such as electronic glasses), electronic clothing, an electronic bracelet, an electronic necklace, electronic accessory, an electronic tattoo, or a smart watch.

According to various example embodiments, the electronic device may be a smart home appliance having a communication function. The smart home appliance, for example, the electronic device may include at least one of a television, a Digital Video Disk (DVD) player, an audio device, a refrigerator, an air conditioner, a vacuum cleaner, an oven, a microwave oven, a washing machine, an air cleaner, a set-top box, a television box (e.g., Samsung HomeSync™, AppleTV™, or Google TV™), game consoles, an electronic dictionary, an electronic key, a camcorder, or an electronic frame.

According to various example embodiments, the electronic device may include at least one of various medical equipments (e.g., a Magnetic Resonance Angiography (MRA) device, a Magnetic Resonance Imaging (MRI) device, a Computed Tomography (CT) device, a scanning device, and an ultrasonic wave device), a navigation device, a Global Positioning System (GPS) receiver, an Event Data Recorder (EDR), a Flight Data Recorder (FDR), a vehicle infotainment device, an electronic equipment for ship (e.g., navigation device for ship and gyro compass), avionics, a security device, or an industrial or home robot.

According to various example embodiments, the electronic device may include at least one of a portion of furniture or building/construction, an electronic board, an electronic signature receiving device, a projector, or various measuring devices (e.g., water supply, electricity, gas, or electric wave measuring device) including a communication function. An electronic device according to the present disclosure may be at least one combination of the foregoing various devices. Further, an electronic device according to the present disclosure is not limited to the foregoing devices.

Hereinafter, an electronic device according to various example embodiments of the present disclosure will be described with reference to the accompanying drawings. A term of a user used in various example embodiments may indicate a person using an electronic device or a device (e.g., artificial intelligence electronic device) using the electronic device.

FIG. 1 is a diagram illustrating a network environment 100 including an electronic device 101 according to various example embodiments of the present disclosure.

Referring to FIG. 1, an electronic device 101 may include a bus 110, a processor 120, a memory 130, an input and output interface 140, a display 150, a communication interface 160, and an image acquisition module 170.

The bus 110 may be a circuit that connects the foregoing elements and that performs communication (e.g., transmit a control message) between the foregoing elements.

The processor 120 may receive an instruction from the foregoing other elements (e.g., the memory 130, the input and output interface 140, the display 150, the communication interface 160, or the image acquisition module 170) through, for example, the bus 110, decode the received instruction, and perform operation and data processing according to the decoded instruction.

The memory 130 may store an instruction or data received from the processor 120 or other elements (e.g., the input and output interface 140, the display 150, the communication interface 160, or the image acquisition module 170) or generated by the processor 120 or other elements. The memory 130 may include a programming module such as a kernel 131, middleware 132, an Application Programming Interface (API) 133, or an application 134. The foregoing respective programming modules may be formed with software, firmware, hardware, or a combination of at least two thereof.

The kernel 131 may control or manage system resources (e.g., the bus 110, the processor 120, or the memory 130) used for executing an operation or a function implemented in the remaining programming modules, for example, the middleware 132, the API 133, or the application 134. Further, the kernel 131 may provide an interface that can access to an individual element of the electronic device 101 in the middleware 132, the API 133, or the application 134 to control or manage the individual element.

The middleware 132 may perform an intermediary function of enabling the API 133 or the application 134 to communicate with the kernel 131 to give and receive data. Further, the middleware 132 may control (e.g., schedule or load balance) a work request received from the application 134 using, for example, a method of aligning a priority that can use a system resource (e.g., the bus 110, the processor 120, or the memory 130) of the electronic device 101 to at least one of the applications 134.

The API 133 is an interface that enables the application 134 to control a function in which the kernel 131 or the middleware 132 provides and may include, for example, at least one interface or function (e.g., instruction) for file control, window control, image processing, or text control.

According to various example embodiments, the application 134 may include an SMS/MMS application, an e-mail application, a calendar application, an alarm application, a health care application (e.g., an application that measures an exercise amount or blood sugar), or an environment information application (e.g., an application that provides atmospheric pressure, humidity, or temperature information). Additionally or alternatively, the application 134 may be an application related to information exchange between the electronic device 101 and an external electronic device (e.g., an electronic device 104). The application related to information exchange may include, for example, a notification relay application that transmits specific information to the external electronic device or a device management application that manages the external electronic device.

For example, the notification relay application may include a function of transmitting notification information that has occurred in other applications (e.g., an SMS/MMS application, an e-mail application, a health care application, or an environment information application) of the electronic device 101 to an external electronic device (e.g., the electronic device 104). Additionally or alternatively, the notification relay application may receive notification information from, for example, an external electronic device (e.g., the electronic device 104) and provide the notification information to a user. For example, the device management application may manage (e.g., install, delete, or update) a function (e.g., turn-on/turn-off of an external electronic device (or a partial component) or brightness (or resolution) adjustment of a display) of at least a portion of an external electronic device (e.g., the electronic device 104) that communicates with the electronic device 101, an application operating in an external electronic device, or a service (e.g., a communication service or a message service) provided in an external electronic device.

According to various example embodiments, the application 134 may include a designated application according to an attribute (e.g., a kind of an electronic device) of an external electronic device (e.g., the electronic device 104). For example, when the external electronic device is an MP3 player, the application 134 may include an application related to music reproduction. Similarly, when the external electronic device is a mobile medical device, the application 134 may include an application related to health care. According to an example embodiment, the application 134 may include at least one of an application designated to the electronic device 101 or an application received from an external electronic device (e.g., a server 106 or the electronic device 104).

The input and output interface 140 may transfer an instruction or data input by a user through an input and output device (e.g., a sensor, a keyboard, or a touch screen) to the processor 120, the memory 130, the communication interface 160, or the image acquisition module 170 through, for example, the bus 110. For example, the input and output interface 140 may provide data about a user touch input through a touch screen to the processor 120. Further, the input and output interface 140 may output an instruction or data received from the processor 120, the memory 130, the communication interface 160, or the image acquisition module 170 through, for example, the bus 110, through the input and output device (e.g., a speaker or a display). For example, the input and output interface 140 may output sound data processed through the processor 120 to the user through a speaker.

The display 150 may display various information (e.g., multimedia data or text data) to the user.

The communication interface 160 may connect communication between the electronic device 101 and an external device (e.g., the electronic device 104 or the server 106). For example, the communication interface 160 may be connected to a network 162 through wireless communication or wire communication to communicate with the external device. The wireless communication may include at least one of, for example, Wireless Fidelity (WiFi), Bluetooth (BT), Near Field Communication (NFC), Global Positioning System (GPS), or cellular communication (e.g., Long Term Evolution (LTE), LTE-A, Code Division Multiple Access (CDMA), Wideband Code Division Multiple Access (WCDMA), Universal Mobile Telephone System (UMTS), Wireless Broadband Internet (WiBro), or Global System for Mobile communication (GSM)). The wire communication may include at least one of, for example, a Universal Serial Bus (USB), a High Definition Multimedia Interface (HDMI), Recommended Standard 232 (RS-232), or a Plain Old Telephone Service (POTS).

According to various example embodiments, the network 162 may be a telecommunication network. The telecommunication network may include at least one of a computer network, Internet, Internet of things, or a telephone network. According to an example embodiment, a protocol (e.g., a transport layer protocol, a data link layer protocol, or a physical layer protocol) for communication between the electronic device 101 and an external device may be supported in at least one of the application 134, the API 133, the middleware 132, the kernel 131, or the communication interface 160.

According to an example embodiment, the image acquisition module 170 may determine a first location (location information) corresponding to, for example, a stored first image and estimate a second location relative to the first location of the electronic device.

According to various example embodiments, when navigation information indicating that the electronic device is within a specified range of a desired location for capturing a second image, the image acquisition module 170 may automatically cause the electronic device to capture an image corresponding to the desired location. In contrast, when the electronic device is not within the specified range of the desired location, the image acquisition module 170 may generate navigation information directing a user how to travel to the desired location. Additional information about the image acquisition module 170 is provided with reference to FIGS. 2 to 14 to be described later.

Figure 2:
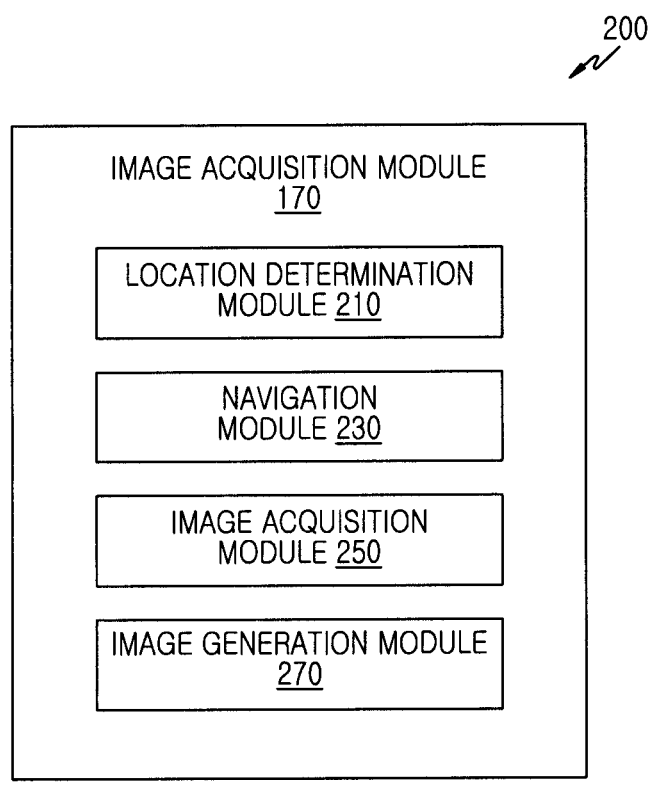
FIG. 2 is a block diagram illustrating a configuration of an electronic device according to various example embodiments of the present disclosure.

FIG. 2 is a block diagram 200 illustrating an image acquisition module 170 of an electronic device (e.g., the electronic device 101) according to various example embodiments of the present disclosure.

Referring to FIG. 2, the image acquisition module 170 may include a location determination module 210, a navigation module 230, an image acquisition module 250, and an image generation module 270.

The location determination module 210 may detect a first location (hereinafter, for convenience of description, a previous location) corresponding to a first image (hereinafter, for convenience of description, a previously captured image) stored at the electronic device (e.g., the electronic device 101). According to an example embodiment, the location determination module 210 may detect the previous location at which the previous image was acquired using a portion of data corresponding to the previous image stored within the electronic device. For example, data corresponding to the previous image stored within the electronic device may include a data segment (e.g., a data header) in which a previous location may be stored. The location determination module 210 may detect a previous location through the data segment of the previous image file.

According to an example embodiment, the previous location may be location information acquired through a sensor module such as GPS, or a communication module such as WiFi, BT, or cellular communication. For example, the previous location may include GPS location information acquired through GPS within a specified time (e.g., 1 minute) in which the electronic device captured the previous image. According to an example embodiment, the previous location may be location information detected through navigation or movement information (e.g., a travel distance, a rotation angle, or a movement direction) acquired using a movement sensor, such as an acceleration sensor, a gyro sensor, or a magnetic sensor. For example, when it is detected that the electronic device is moved '1 m to the east' from a specified location through an acceleration sensor, the previous location may be determined to be located distally at 1 m from the specified location, in an eastward direction. The navigation module 230 may detect movement information from the previous location to a second location (hereinafter, for convenience of description, a present location) of the electronic device. The movement information may include, for example, information of at least one of a movement distance (such as a number of steps of a user), an angle between the previous location and the present location, or a travel time between the previous location and the present location, or a directional indicator starting from previous location and ending at a present location. According to an example embodiment, the navigation module 230 may acquire the movement information based on movement of the electronic device. The navigation module 230 may acquire the movement information of the electronic device through a sensor (e.g., an acceleration sensor, a gyro sensor, or a terrestrial magnetic sensor), as previously mentioned.

For example, the navigation module 230 may detect the number of steps (e.g., 3 steps) or a distance (e.g., 1 m) between the previous location and a present location through an acceleration sensor included in the electronic device. Further, the navigation module 230 may acquire a rotation angle (e.g., 30°) of the electronic device from a previous location through a gyro sensor included in the electronic device. Further, the navigation module 230 may acquire a direction (e.g., East-South 120°) from a previous location to a present location through a terrestrial magnetic sensor included in the electronic device.

According to an example embodiment, the navigation module 230 may acquire movement information based on location information about a present location. The navigation module 230 may acquire location information about a present location of the electronic device using, for example, a location module or a communication module (e.g., GPS, WiFi, BT, or cellular communication module) functionally connected to the electronic device. For example, the navigation module 230 may acquire GPS location coordinate information about a present location of the electronic device using GPS. The navigation module 230 may acquire a distance or an angle between a previous location and a present location or a direction from a previous location to a present location using location information about an acquired present location.

The image acquisition module 250 may automatically acquire a second image (hereinafter, for convenience of description, a present image) when reaching a present location, as determined by movement information of the electronic device.

According to an example embodiment, the image acquisition module 250 may determine whether moving information belongs to a specified range. For example, the specified range may be a moving range of the electronic device that can photograph an image in which at least a portion of a previous image is included. Further, for example, the specified range may be a moving range specified by a user or a designer of the electronic device.

According to an example embodiment, when moving information belongs to a specified range, the image acquisition module 250 may automatically acquire a present image corresponding to a present location through, for example, a camera (or an image sensor) included in the electronic device. In contrast, according to an example embodiment, when moving information does not belong to a specified range, the image acquisition module 250 may provide guide information. For example, in order to enable moving information of the electronic device to belong to a specified range, guide information may include information about a distance, a direction, and a time in which the electronic device should move. The guide information may be provided with, for example, a voice, progress, a vibration, a text, an image, or an icon. The guide information is not limited to the foregoing example.

For example, when the specified range is '0.8 m to 1.2 m forward', if a moving distance of the electronic device is '0.5 m forward', the image acquisition module 250 may provide guide information 'requesting to move forward (e.g., requesting to move 0.3 m forward)'. However, when a moving distance of the electronic device is '1.5 m forward', the image acquisition module 250 may provide guide information, for example, 'requesting to move backward (e.g., requesting to move 0.3 m backward)'. For example, when the specified range is '20° to 40° clockwise', if a moving angle of the electronic device is '10° clockwise', the image acquisition module 250 may provide guide information 'requesting to rotate clockwise'. However, when a moving angle of the electronic device is '50° clockwise', the image acquisition module 250 may provide guide information 'requesting to rotate counterclockwise'.

According to an example embodiment, the image acquisition module 250 may acquire a present image based on information of at least one of a time in which the electronic device is located at a present location, a shaking level, or a slope of the electronic device. For example, when the electronic device is located at a present location for a specified time (e.g., for 10 seconds), the image acquisition module 250 may automatically acquire a present image corresponding to the present location. In contrast, when the electronic device is not located at a present location for a specified time, the image acquisition module 250 may provide guide information requesting to locate at the present location for a specified time.

Further, for example, when a shaking level of the electronic device belongs to a specified level, the image acquisition module 250 may automatically acquire a present image corresponding to a present location. In contrast, when a shaking level of the electronic device does not belong to a specified level (e.g., a low shaking level) (e.g., when a shaking level is larger than a specified level), the image acquisition module 250 may provide guide information requesting to lower a shaking level. Further, when a slope of the electronic device belongs to a specified angle range (e.g., within 10° from the ground), the image acquisition module 250 may automatically acquire a present image corresponding to a present location. In contrast, when a slope (e.g., 20° from the ground) of the electronic device does not belong to a specified angle range, the image acquisition module 250 may provide guide information requesting a slope change (e.g., 'Pleas tilt the electronic device to the opposite side') to correspond to a specified angle range. According to an example embodiment, the image acquisition module 250 may acquire a present image based on a photographing pattern of a previous image (e.g., a moving means that acquires a previous image, a location, a rotation (or a slope) state (e.g., photographing direction, photographing angle) of the electronic device (e.g., camera functionally connected to the electronic device), and a view angle relative to a previous image). According to various example embodiments, the image acquisition module 250 may estimate a location to acquire a present image based on a photographing pattern of a previous image. For example, the image acquisition module 250 may determine a direction, a distance, and a location that can acquire a present image based on a view angle.

The image generation module 270 may provide an image including previous location information corresponding to a previous location and present location information corresponding to a present location based on at least a portion of a previous image and at least a portion of a present image. According to an example embodiment, the image generation module 270 may sequentially connect at least a portion of a previous image and at least a portion of a present image. According to an example embodiment, the image generation module 270 may generate an intermediate image corresponding to an intermediate location between a previous location and a present location using at least a portion of a previous image and at least a portion of a present image. The image generation module 270 may generate, for example, at least one image that can connect a previous image and a present image into an intermediate image.

For example, when a present image is an image enlarged by twice greater than a previous image, an intermediate image may be an image enlarged by 1.5 times greater than the previous image. Further, when a previous image includes a first area in which a previous image and a present image are overlapped and a second area, which is the remaining area, and when a present image includes the first area and a third area, which is the remaining area, an intermediate image may include the first area and a portion of the second area or a portion of the third area. According to an example embodiment, the image generation module 270 may connect a generated intermediate image to an intermediate location between a previous location and a present location.

According to an example embodiment, the image generation module 270 may sequentially reproduce each of at least a portion of a previous image and at least a portion of a present image in relation to previous location information or present location information. Sequential reproduction may be playing back the captured images one by one as a representation of travel from the previous location to the present location. Playing back the captured images one by one may include the playing back a first captured image in association with a second captured image and then playing back the second captured image in association with a third captured image and so on. For example, the image generation module 270 may sequentially connect a previous image and a present image to provide the connected previous image and present image as a moving picture. According to an example embodiment, the image generation module 270 may reproduce at least one intermediate image between at least a portion of a previous image and at least a portion of a present image in relation to location information about an intermediate location.

According to an example embodiment, the image generation module 270 may generate a map using previous location information corresponding to a previous location and present location information corresponding to a present location. For example, the image generation module 270 may generate a path in which previous location information and present location information is connected as a map. According to an example embodiment, the image generation module 270 may simultaneously provide the generated map together with a previous image and a present image. For example, the image generation module 270 may reproduce a map including a previous image and previous location information and sequentially reproduce a map including a present image and present location information. According to an example embodiment, previous location information may include previous direction information corresponding to a previous image, and present location information may include present direction information corresponding to a present image.

The image generation module 270 may store a previous image and a present image, for example, at a memory (e.g., the memory 130). According to various example embodiments, the image generation module 270 may store a photographing pattern (e.g., a photographing location, a photographing direction, a photographing angle, and a photographing time) in relation to an image. According to various example embodiments, the image generation module 270 may generate a plurality of images including a previous image and a present image into an image. According to various example embodiments, when generating a plurality of images into an image, the image generation module 270 may process to include information representing a location moving path and a photographing path corresponding to each of a plurality of images.

According to various example embodiments, the electronic device (e.g., the electronic device 101) for acquiring an image may include a location determination module (e.g., the location determination module 210) for determining a first location (e.g., a previous location) corresponding to a first image (e.g., a previous image) stored at the electronic device, a navigation module (e.g., the navigation module 230) for determining moving information (e.g., move a distance of 1 m forward) from the first location to a second location (e.g., a present location) of the electronic device, and an image acquisition module (e.g., the image acquisition module 250) for automatically acquiring a second image (e.g., a present image) corresponding to the second location when the moving information belongs to a specified range (e.g., 0.8 m to 1.2 m forward).

According to various example embodiments, the location determination module may acquire a first location through at least a portion (e.g., a header) of data corresponding to the first image.

According to various example embodiments, the location determination module may determine a location of the electronic device in which the first image is acquired to the first location.

According to various example embodiments, the navigation module may acquire information of at least one of a distance or an angle between the first location and the second location or a direction from the first location to the second location as the moving information.

According to various example embodiments, the navigation module may acquire the step number of a user of the electronic device as the moving information.

According to various example embodiments, the second image may include a portion of the first image.

According to various example embodiments, the image acquisition module may acquire the second image based on information of at least one of a time in which the electronic device is located at the second location, shaking, or a slope of the electronic device.

According to various example embodiments, when the moving information belongs to a range different from the specified range, the image acquisition module may output guide information corresponding to a difference between the moving information and the specified range.

According to various example embodiments, the electronic device may further include an image generation module (e.g., the image generation module 270) that generates a map including first location information corresponding to the first location and second location information corresponding to the second location based on at least a portion of the first image and at least a portion of the second image.

According to various example embodiments, the image generation module may generate the map further including direction information about a first direction corresponding to at least a portion of the first image and a second direction corresponding to at least a portion of the second image.

According to various example embodiments, the image generation module may output map information corresponding to the map.

According to various example embodiments, the image generation module may reproduce at least a portion of the first image in relation to the first location information and reproduce at least a portion of the second image in relation to the second location information. According to an example embodiment, the image generation module may sequentially reproduce each of at least a portion of the first image and at least a portion of the second image in relation to the first location information or the second location information. Sequential reproduction may include image transitions when viewing images. For example, a first image may be reproduced according to an expanded (or reduced) size with time based on the predetermined scenario (or according to a manual input) until the size of object in the first image is corresponding to a size of the same object in a second image in order to achieve image smooth transitions. According to various example embodiments, the image generation module may generate a third image corresponding to a third location between the first location and the second location, the third image generated from data including at least a portion of the first image and at least a portion of the second image.

Figure 3:
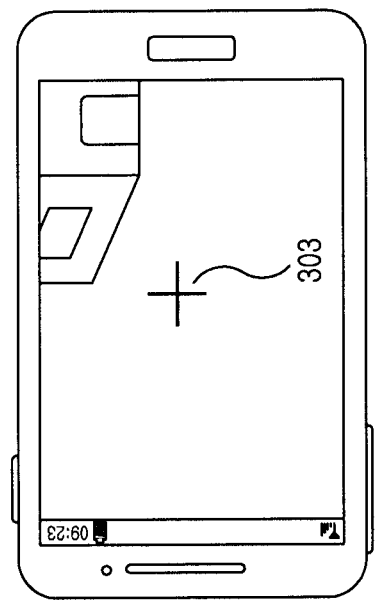
FIG. 3 is a diagram illustrating an output screen of an electronic device according to various example embodiments of the present disclosure
Figure 3:
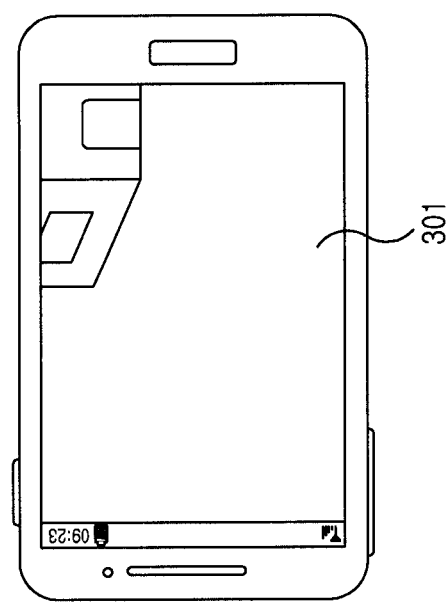
Figure 4:
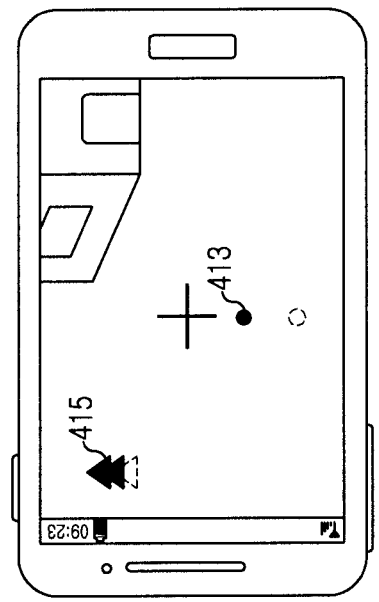
FIG. 4 is a diagram illustrating an output screen of an electronic device according to various example embodiments of the present disclosure.
Figure 4:
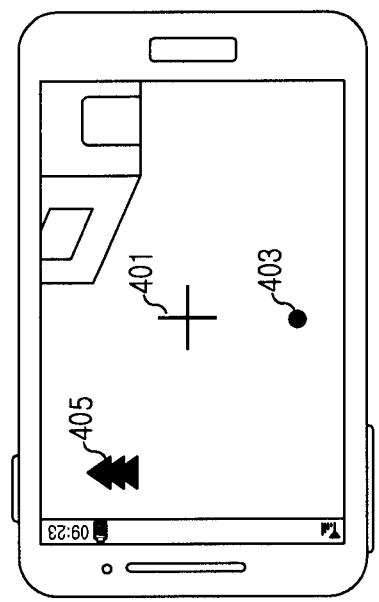

FIG. 3 and FIG. 4 are diagrams illustrating an output screen of an electronic device according to various example embodiments of the present disclosure. In a description of FIGS. 3 to 4, a description of concepts described in or similar to those already described with reference to FIG. 2 will be omitted.

According to various example embodiments, the electronic device may automatically capture a second image in response to detecting movement from a first location (e.g., a previous location) corresponding to a stored first image (e.g., a previous image) to a present location of the electronic device. According to various example embodiments, the electronic device may specify a range (that is, a desired location in which to capture the second image) such that, for example, at least a portion of a first image is captured within the second image. When the current position of the electronic device is within a specified range of the second location, the electronic device may acquire a second image and store it along with location information indicating the present location. The electronic device may automatically capture the second image according to further considerations, such as the electronic device being located at the desired location for a prespecified quantity of time (e.g., for 10 seconds), a "shaking level" of the electronic device (e.g., a level of instability in supporting the electronic device) being at, under or greater than a prespecified level of shaking, and a slope or inclination angle of the electronic device being at, less than, or greater than a prespecified angle range (e.g., being within 10° from a plane horizontal with the ground).

According to various example embodiments, when the electronic device is not within the prespecified range of the desired location, the electronic device may generate and display navigation information directing a user to the location in which the second image will be automatically acquired. According to various example embodiments, the electronic device may thus provide a direction to the desired location, a distance to the desired location, and/or a travel time to the desired location to guide the user.

Referring now to FIGS. 3 and 4, a first image 301 is shown as acquired. In order to automatically acquire a second image, the electronic device may display information 303 aiding navigation to a certain distance from the present location (where the first image 301 was captured), or otherwise to a desired location where the second image is to be captured.

According to various example embodiments, the electronic device may display various navigation information to the specified distance or location.

For example, as shown in FIG. 4, the electronic device may display a cross mark 401 representing a target location and a point mark 403 indicating a present location of the electronic device relative to the target location. Further, the electronic device may display guide information icon 415, which, in this case, is a triangular icon that representing a direction and a distance to the target location.

According to various example embodiments, the electronic device may update the guide information 405 or moving information as the electronic device approaches the target location. The update may take the form of alterations in location, size, and color of any of the displayed objects or elements. According to various example embodiments, as the electronic device moves, the point mark 413 may move towards the cross mark 401 to represent movement of the electronic device towards the desired location. According to other various example embodiments, when the electronic device moves, the guide information icon 415 may be altered to represent the remaining distance to the target location. For example, as a remaining distance to the specified range reduces, a size of the guide information icon 415 may likewise be reduced.

Figure 5:
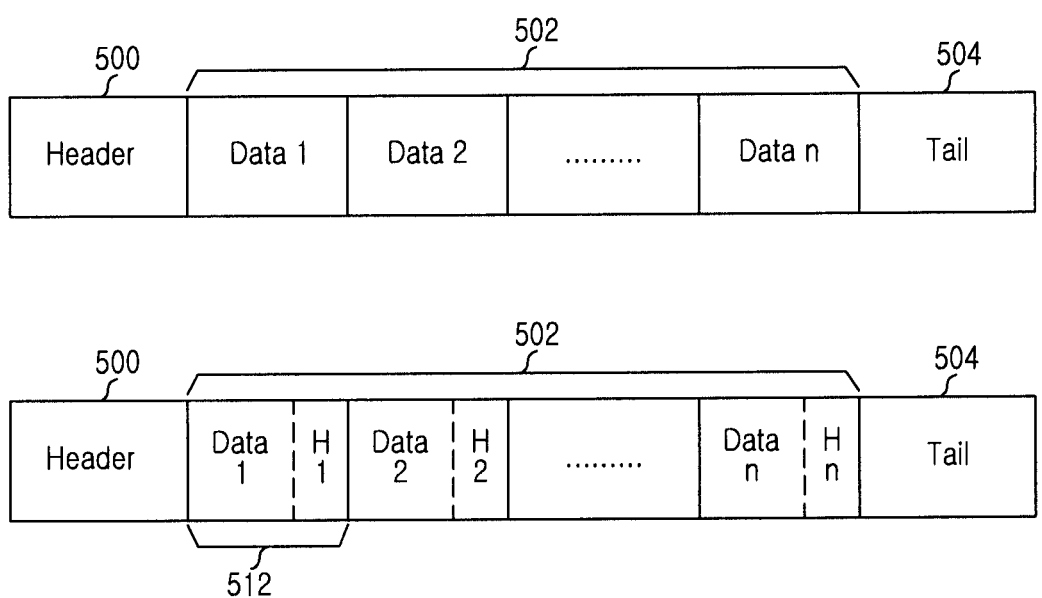
FIG. 5 is a diagram illustrating an image structure according to various example embodiments of the present disclosure.

FIG. 5 is a diagram illustrating a data structure from an image according to various example embodiments of the present disclosure.

According to various example embodiments, the electronic device may generate an image file including a header area 500, a body area 502, and a tail area 504.

The header area 500 may include information utilized for decoding an image, for example, the number of data blocks included in the body area 502 and a data size of the body area 502.

The body area 502 may include at least one data block, and a size of the body area 502 may be variable in size according to the number of data blocks and a size of a data block recorded in each data block. The data block may include a still picture, such as, for example, "JPG" data.

The tail area 504 may include information that can divide an area included in the image, for example, information representing a start location of the header area 500 and information representing termination of data.

According to various example embodiments, the electronic device may determine a location corresponding to an acquired image.

According to various example embodiments, the electronic device may include a location corresponding to each image in the header area 500.

According to various example embodiments, the electronic device may include a location corresponding to each image in the body area 502. For example, data blocks 512 included in the body area 502 may include a header and may include a location in a header corresponding to each data block.

Figure 6:
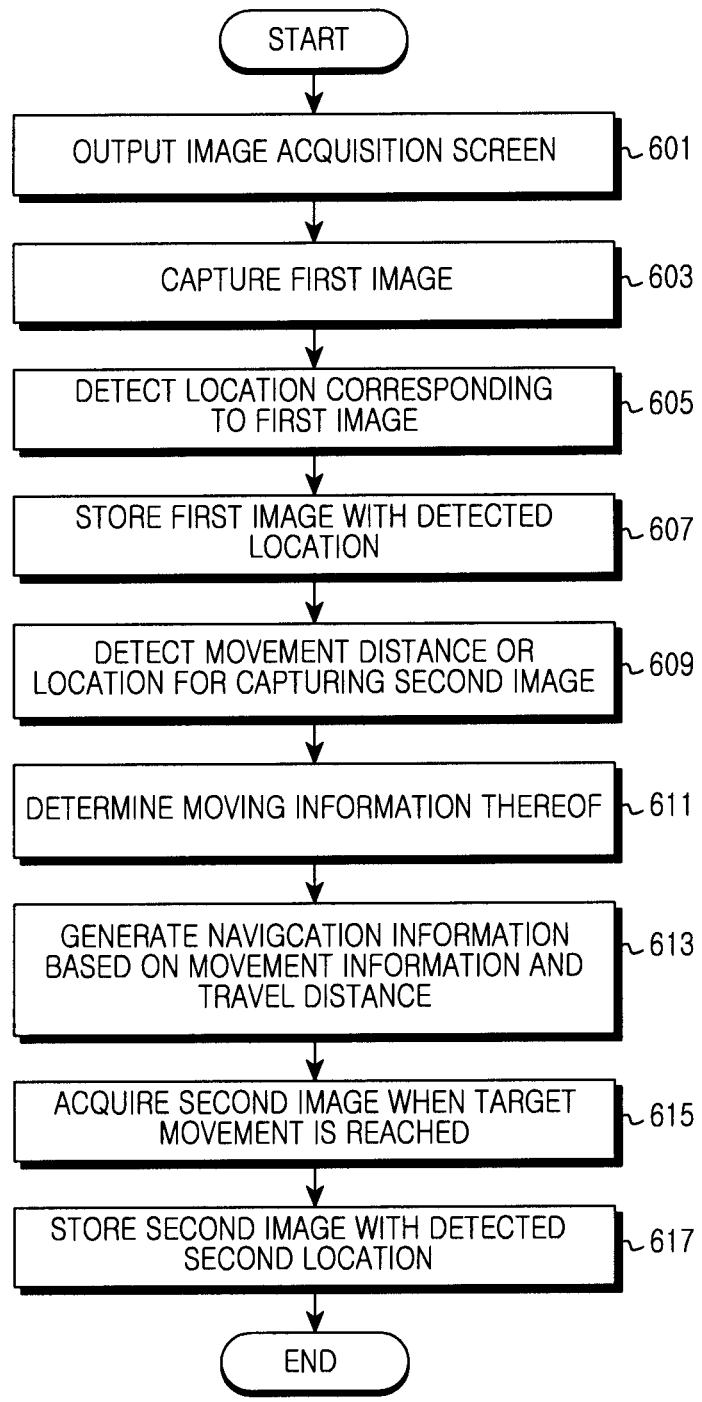
FIG. 6 is a flowchart illustrating operation of an electronic device according to various example embodiments of the present disclosure.

FIG. 6 is a flowchart illustrating operation of an electronic device according to various example embodiments of the present disclosure. In a description related to FIG. 6, a description of the same portion as or a portion similar to that of FIG. 2 will be omitted.

The electronic device may display an image acquisition screen (601) (e.g., a preview for capturing photos on the display). According to various example embodiments, the image may include a moving picture (e.g., an animation or a video) and a still picture, and the image acquisition screen may including an execution screen of a camera function (such as a camera user interface), and a screen that reproduces a stored image (such as a gallery).

The electronic device may acquire a first image (603). According to various example embodiments, the electronic device may acquire a first image displayed on a preview screen in response to any input, such as activation of a key or button, a voice command, a gesture input, and a touch input.

The electronic device may detect a present location of where the first image was captured (605). According to various example embodiments, the electronic device may detect location information and/or movement information (e.g., a movement distance, a rotation angle, or a movement direction) within specified time range of capturing the first image. According to various example embodiments, the electronic device may use a communication module or sensor module such as GPS, WiFi, BT, or cellular communication and/or a sensor such an acceleration sensor, a gyro sensor, or a magnetic sensor to detect the location for the first image.

The electronic device may store a first image, including the detected location (607). According to various example embodiments, the electronic device may store the detected location in a data segment of the image file, such as, for example, a header of the first image.

The electronic device may detected a second location in which to automatically photograph a second image (609). According to various example embodiments, the second image may be set so as to include a portion of a first image. According to various example embodiments, the electronic device may detect the movement range or a desired location for capture of a second image, based on a location of capture of the first image. According to various example embodiments, the electronic device may detect the movement range based on a view angle of the image acquisition module 250 such as a camera or an image sensor The electronic device may generate navigation information to the desired distance or target location (611). According to various example embodiments, the electronic device may detect a movement distance, a movement direction, and a travel time from the location of the first image to a target location.

Additionally, the electronic device may generate navigation information based on movement information and a movement range (613). Here, the navigation information may indicate a distance, a direction, and a travel time that a user would move in order to approach the desired movement distance or location. According to various example embodiments, when the electronic device has not yet reached the desired distance or location, the electronic device may generate and display the guide information.

The electronic device may acquire a second image when the movement information and/or a movement range (615) indicate the target distance or location has been reached. According to various example embodiments, when the movement information indicates that the electronic device has traveled the target distance or to the target location, the electronic device may capture a second image.

The electronic device may store the captured second image (617). According to various example embodiments, the electronic device may detect a location corresponding to the second image and store the location in relation to the second image. According to various example embodiments, the electronic device may combine and store the first image and the second image as a single image.

Figure 7:
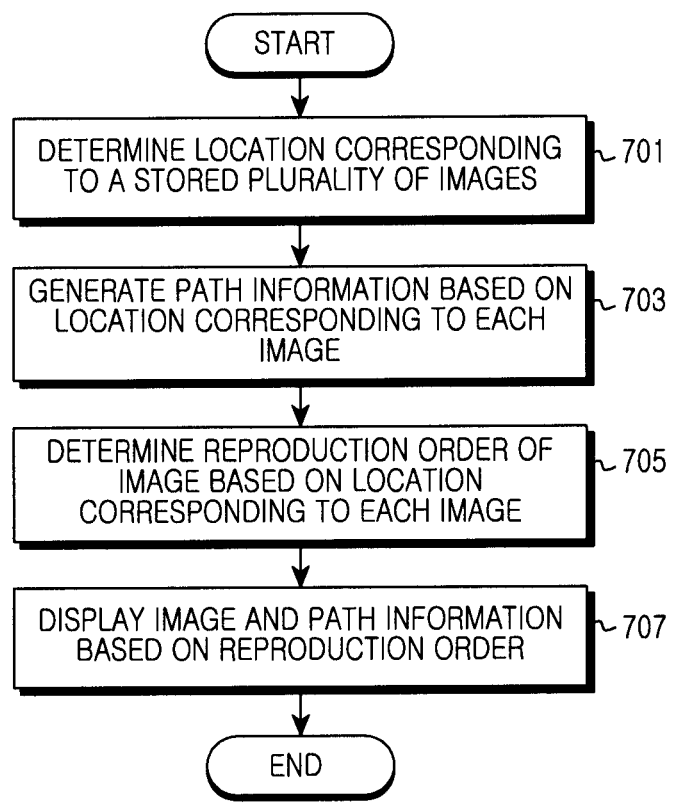
FIG. 7 is a flowchart illustrating operation of an electronic device according to various example embodiments of the present disclosure.

FIG. 7 is a flowchart illustrating operation of an electronic device according to various example embodiments of the present disclosure. In a description related to FIG. 7, a description of the same portion as or a portion similar to that of FIG. 2 will be omitted.

According to various example embodiments, the electronic device may reproduce a plurality of stored images. According to various example embodiments, the electronic device may sequentially reproduce each image according to a condition. Sequential reproduction may be a slide show display of images. For example, a first stored image and a second stored image may be reproduced according to a slide show display of images. For example, a first image is reproduced until an object in a right edge of the first image is corresponding to the same object in a left edge of the second image in order to achieve sequential and smooth transitioned slide show. In the present example embodiment, an operation of an electronic device generating a combined image will be described.

The electronic device may detect locations corresponding to a stored plurality of images (701). According to various example embodiments, the plurality of images may be stored as files including a plurality of data blocks forming an image, each file including the location information.

The electronic device may generate path information (e.g. indicating a movement path as each image was captured) based on the location information of each image (703). According to various example embodiments, the path information may thus connect the individual locations corresponding to each image under consideration.

The electronic device may therefore generation a reproduction order (or display order) of the captured image based on a location of each image (705), correlated to the generated path information. According to an example embodiment, the electronic device may sequentially reproduce images based on the order.

The electronic device may then display the images and generate a representation of the path based on reproduction order (707).

FIG. 8A-FIG. 8D are diagrams illustrating an operation screen of an electronic device according to various example embodiments of the present disclosure. In a description related to FIG. 8A-8D, a description of the same portion as or a portion similar to that of FIGS. 3 and 4 will be omitted.

Figure 8A:
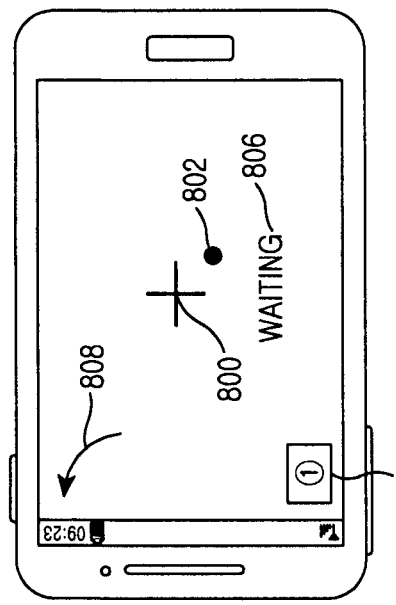
FIG. 8A, FIG. 8B, FIG. 8C and FIG. 8D are diagrams illustrating an operation screen of an electronic device according to various example embodiments of the present disclosure.

Referring now to FIG. 8A, according to various example embodiments, the electronic device may estimate, detect or determine a location 800 to acquire a second image, the location 800 based on a location corresponding to a stored first image 804. For example, the electronic device may define a movement distance where the potential second image will include at least a portion of the first image 804.

According to various example embodiments, the electronic device may display objects, icons or elements representing a location 800 in which to acquire the second image and a present position (e.g., present location 802) of the electronic device. According to various example embodiments, the electronic device may display a message 806 indicating whether the acquisition condition for capturing a second image has been satisfied.

According to various example embodiments, the electronic device may provide navigation information 808 to aid second image acquisition.

Figure 8B:
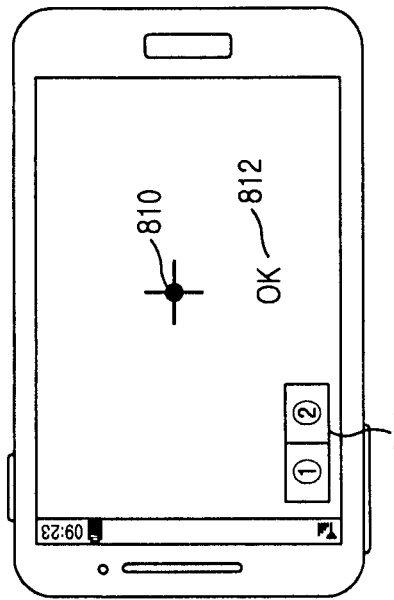

As seen in FIG. 8B, according to various example embodiments, when location information for the electronic device indicates it is has been moved sufficiently as to acquire the second image, the electronic device may display a message 812 notifying that an acquisition condition of a second image is satisfied. For example, by display a message such as "Please photograph" or "Ok", the electronic device may notify a user that the electronic device can now acquire a second image. In another example, when the movement or location information indicates that the electronic device has not moved to a location designated for acquiring a second image, the electronic device may display a message indicating that the acquisition condition of the second image is not satisfied. For example, the electronic device may display a message such as "Waiting" or "Please wait a second", thus indicating that the electronic device cannot presently acquire a second image.

According to various example embodiments, when the previously defined condition is satisfied, the electronic device may capture the second image and indicate that the second image has been stored 814. Further conditions may be dictated for the automatic capture of the second image, including the electronic device being disposed at the desired location for a specified time (e.g., for 10 seconds), a shaking level of the electronic device (e.g. an instability level) being at, below or greater than a predefined level, and a slope (or inclination angle) of the electronic device being within a specified angle range (e.g., within 10° of horizontal from or parallel to the ground).

According to various example embodiments, after a second image is captured, the electronic device may further estimate a location to acquire a third image based on a location corresponding to the second image.

Figure 8C:
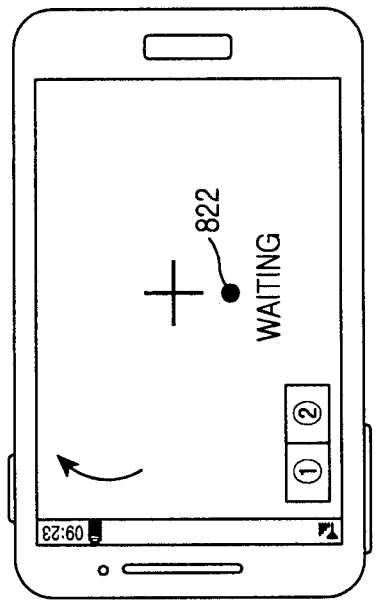

As seen in FIG. 8C, according to various example embodiments, the electronic device may display a location for acquiring the third image and displaying movement or position information icon 822 (e.g., indicating a present location) of the electronic device, and may further display a message 822 indicating whether an acquisition condition of the third image is satisfied.

Figure 8D:
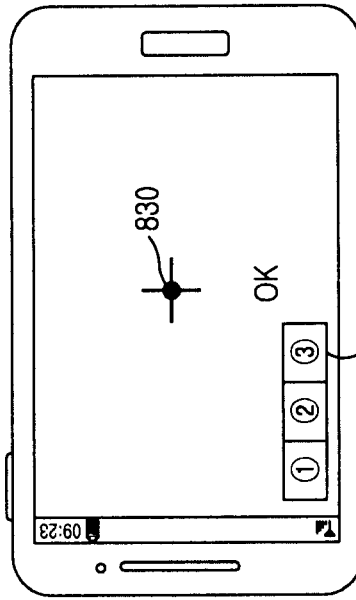

As seen in FIG. 8D, according to various example embodiments, the electronic device may provide navigation information for the third image acquisition, and when an acquisition condition of the third image is satisfied 830, the electronic device may acquire and store 832 the third image.

FIG. 9A-FIG. 9D are diagrams illustrating an operation screen of an electronic device according to various example embodiments of the present disclosure. According to various example embodiments, the electronic device may reproduce a stored plurality of images.

According to various example embodiments, the electronic device may determine a moving path thereof based on a location corresponding to each image. According to various example embodiments, the electronic device may connect location information corresponding to each image and generate a moving path.

Figure 9A:
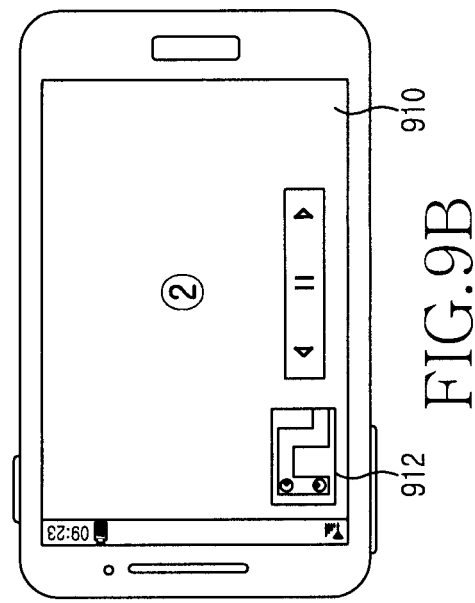
FIG. 9A, FIG. 9B, FIG. 9C and FIG. 9D are diagrams illustrating an operation screen of an electronic device according to various example embodiments of the present disclosure.

As shown in FIG. 9A-FIG. 9D, and referring particularly now to FIG. 9A, the electronic device may display a movement path together with an image. For example, while a first image is displayed 900, the electronic device may display a map display 904 including location information for the displayed first image.

Figure 9B:
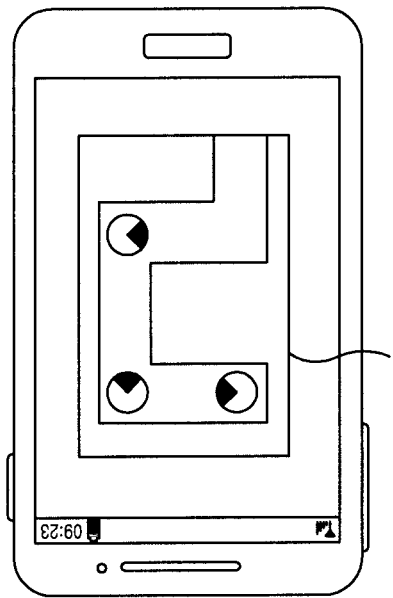

As seen in FIG. 9B, according to various example embodiments, when a second image is displayed 910, the electronic device may display a map display 912 indicating the location where the second image was captured and the updated movement path of the electronic device. According to various example embodiments, the electronic device may thus display a movement path connecting location information for a plurality of stored images, each including location information, and generate a map display of the respective locations while display the stored images.

Figure 9C:
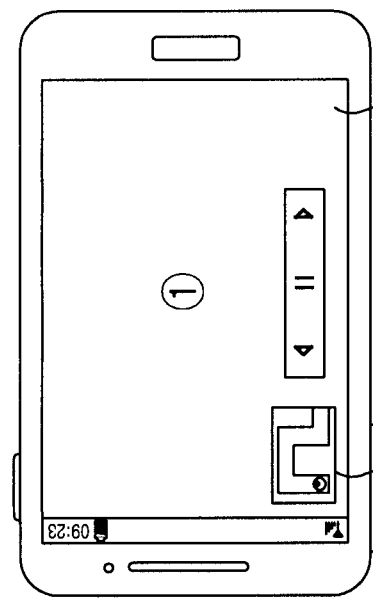

Referring now to FIG. 9C, according to various example embodiments, the electronic device may display a map display 922 indicating an estimated location for a generated image (e.g., the "third image") on the displayed movement path.

Figure 9D:
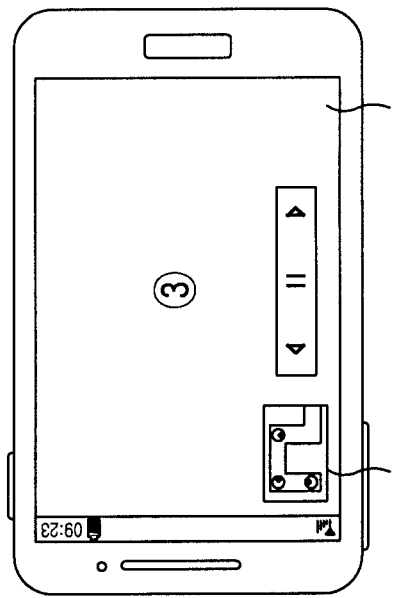

As seen in FIG. 9D, according to various example embodiments, location information displayed on a movement path display map 930 may represent an acquisition point of an image and may additionally include information such as a photographing direction, and a time of capture. For example, as shown in FIG. 9D, a partial area (e.g., shaded portions) of the location information may be used to represent a photographing direction. Such location information may be represented with various methods. For example, time information may be together output.

Figure 10B:
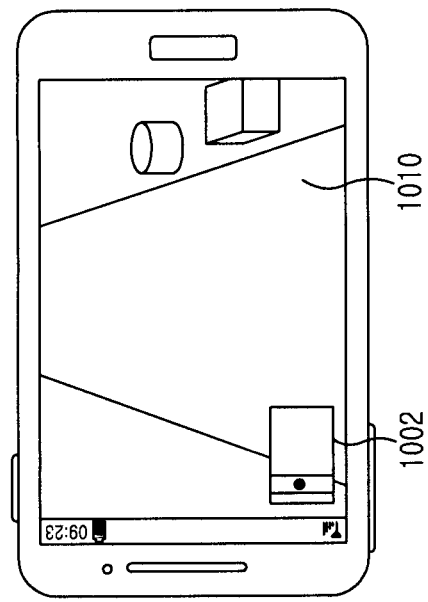
FIG. 10A, FIG. 10B and FIG. 10C are diagrams illustrating an operation screen of an electronic device according to various example embodiments of the present disclosure.
Figure 10A:
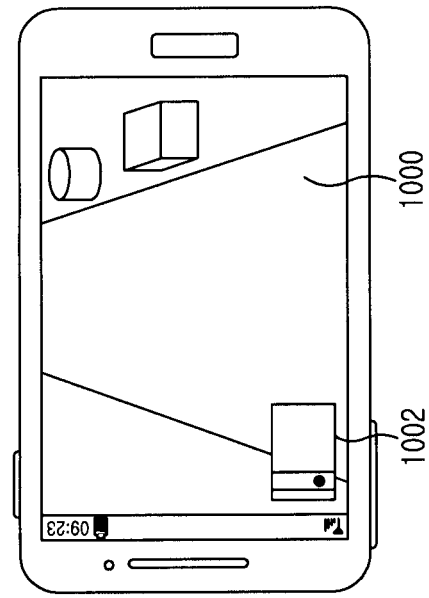
Figure 10C:
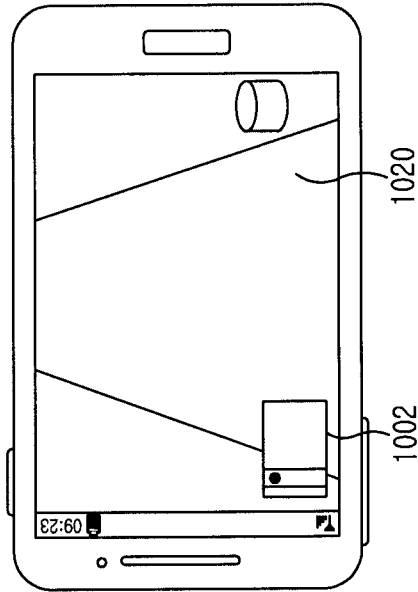

FIG. 10A-10C are diagrams illustrating an operation screen of an electronic device according to various example embodiments of the present disclosure. According to various example embodiments, the electronic device may reproduce a stored plurality of images. According to various example embodiments, the electronic device may automatically acquire an image when reaching a predetermined time interval or when detecting the electronic device has been moved a target distance.

According to various example embodiments, the electronic device may change magnification power of a first image to magnification power satisfying a condition and process to express the first image with an image photographed while moving. For example, the electronic device may provide a photographed effect while enlarging a first image and moving forward to a time point in which a second image is reproduced. In contrast, the electronic device may provide a photographed effect while reducing a first image and moving backward to a time point in which a second image is reproduced. For example, a first image may be reproduced according to an expanded size with time goes on based on the predetermined scenario (or according to a manual input) until the size of object in the first image is corresponding to a size of the same object in a second image in order to achieve image smooth transitions.

As shown in FIG. 10A, after displaying a first image 1000 and a map display 1002 indication a location correlating to the first image 1000, the electronic device may display a second image 1020 (e.g., FIG. 10C) while adjusting screen magnification power of the first image 1000 to produce the interim display image 1010 (e.g., FIG. 10B). The first image is thus displayed as a magnified image 1010, and the map display 1002 may in some instances not be changed. The electronic device may ten update displayed map 1002 when the second image 1020 is displayed (e.g., FIG. 10C).

Figure 11A:
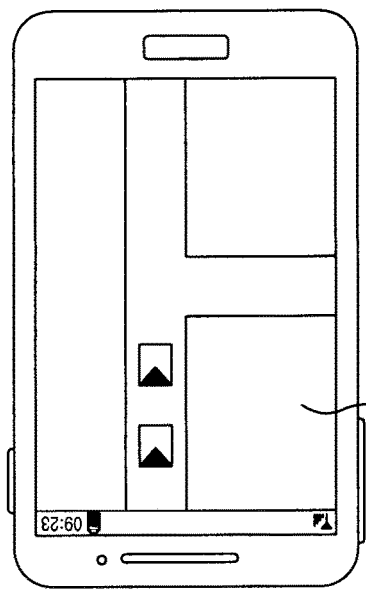
FIG. 11A, FIG. 11B and FIG. 11C are diagrams illustrating an operation screen of an electronic device according to various example embodiments of the present disclosure.
Figure 11B:
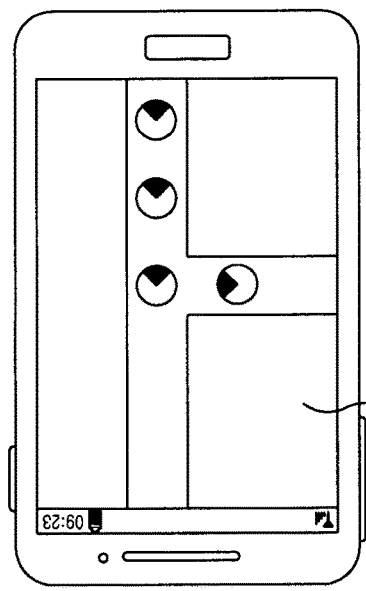
Figure 11C:
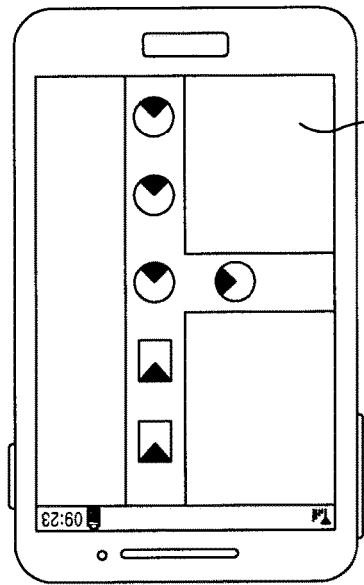

FIG. 11A-FIG. 11C are diagrams illustrating an operation screen of an electronic device according to various example embodiments of the present disclosure.

According to various example embodiments, the electronic device may combine into a single image a first image that was stored, and a second image that was received from an external data source. Here, the first image and/or the second image may be formed into a combined image utilizing a plurality of sub-images.

As shown in FIG. 11A, a stored first image 1100 is displayed, which was captured while an object entered an intersection and turned right. The electronic device may receive a second image 1110 that captured another object moving towards the left side of the same intersection, as seen in FIG. 11B. The electronic device may combine the images 1100 and 1110 into a single image 1120, as seen in FIG. 11C.

According to various example embodiments, the electronic device may generate movement path based on the combined single image 1120 using location information of each image to be combined. For example, the movement path of the object within the image may be used to generate the movement path. According to an example embodiment, the electronic device may separate a movement path of the first image and a movement path of the second image.

Figure 12:
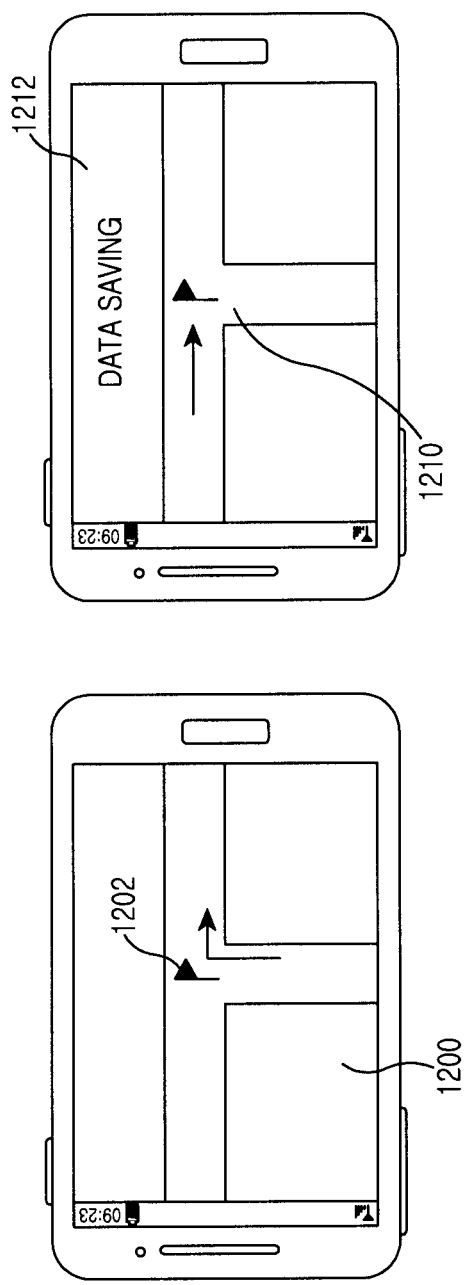
FIG. 12 is a diagram illustrating an operation screen of an electronic device according to various example embodiments of the present disclosure.

FIG. 12 is a diagram illustrating an operation screen of an electronic device according to various example embodiments of the present disclosure.

According to various example embodiments, the electronic device may utilize an icon to mark a data storage location, a photographing start location, and a photographing type and/or a location. According to an example embodiment, the electronic device may store an image based on a previously defined location and a present location of the electronic device. For example, when it is determined that the electronic device enters a previously defined location based on a movement thereof, the electronic device may store an image photographed while moving.

As shown in FIG. 12, the electronic device designates a data storage location, an icon 1202 representing a storage location is display on screen 1200, and when the electronic device acquires a plurality of second images based on an acquisition location of a first image while moving and stores a plurality of acquired second images in response to approaching to an area corresponding to the data storage location. For example, the electronic device may display a message 1212 notifying that the acquired second images (e.g., "data saving") are being stored and movement path 1210 notifying that the electronic device is approaching to the area corresponding to the data storage location.

Figure 13:
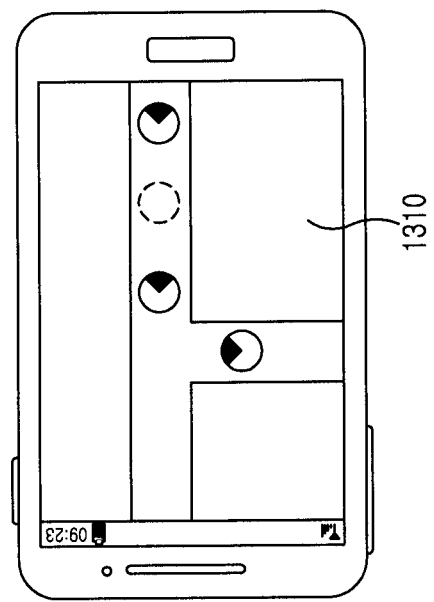
FIG. 13 is a diagram illustrating an operation screen of an electronic device according to various example embodiments of the present disclosure.
Figure 13:
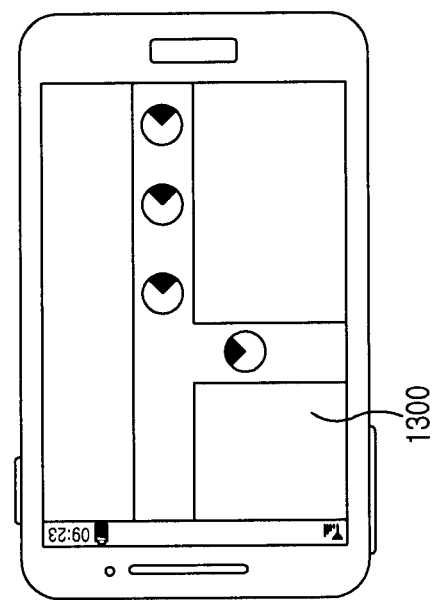

FIG. 13 is a diagram illustrating an operation screen of an electronic device according to various example embodiments of the present disclosure. According to various example embodiments, the electronic device may detect a movement path based on location information related to each image. According to various example embodiments, a movement path may be displayed in a map form with location information about each image within the movement path.

FIG. 13 may be an enlarged display of a movement path of a sequence of images. Icons indicating location information included in the movement path may be related to the number of acquired images. For example, as the number of acquired images increase, icons representing location information included in display of the movement path increases.

The electronic device may edit a map display 1300 displaying a movement path. For example, by deleting location information icon 1310 the electronic device may reduce the number of displayed location information icons. Here, redundant location information icons beneficially deleted may be icons in which a movement direction, a photographic capture direction, or a photographing angle is the same as others in the sequence.

Figure 14:
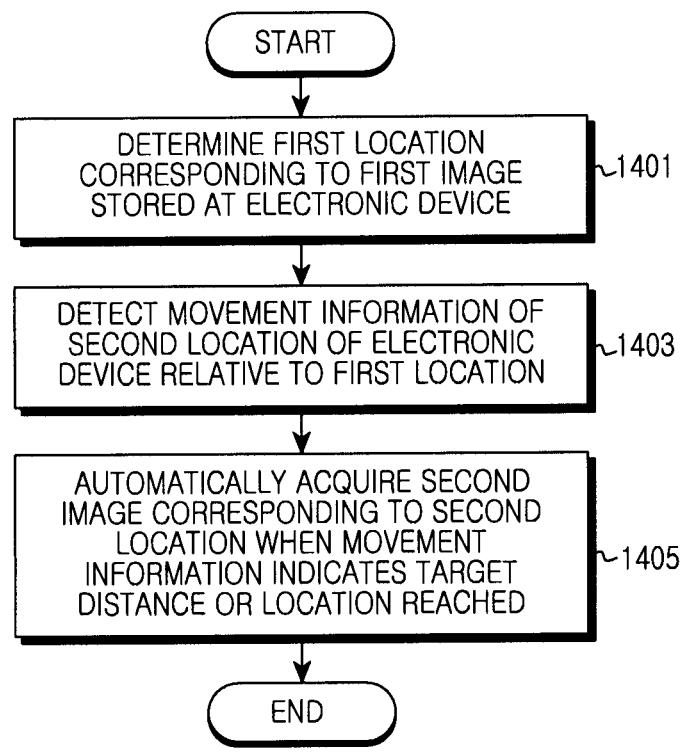
FIG. 14 is a flowchart illustrating operation of generating an image of an electronic device according to various example embodiments of the present disclosure.

FIG. 14 is a flowchart illustrating operation of generating an image in an electronic device (e.g., the electronic device 101) according to various example embodiments of the present disclosure.

The electronic device may detected a first location (e.g., a previous location) corresponding to a captured first image (e.g., a previous image) stored within the electronic device (1401).

The electronic device may determine a movement or navigation (e.g., move a distance of 1 m forward) from the first location to a second location (present location) of the electronic device (1403), to capture a second image.

When the movement information is within a prespecified range of the second location or target distance (e.g., 0.8 m to 1.2 m forward), the electronic device may automatically acquire a second image (e.g., a present image) corresponding to a second location (1405). According to an example embodiment, the electronic device may sequentially reproduce each of at least a portion of a first image and at least a portion of a second image in relation to a first location and a second location.

According to various example embodiments, a method of acquiring an image in an electronic device (e.g., the electronic device 101) may include operation of determining a first location (e.g., a previous location) corresponding to a first image (e.g., a previous image) stored at the electronic device, operation of determining moving information (e.g., move a distance of 1 m forward) from the first location to a second location (present location) of the electronic device, and operation of automatically acquiring a second image (e.g., a present image) corresponding to the second location when the moving information belongs to a specified range (e.g., 0.8 m to 1.2 m forward).

According to various example embodiments, operation of determining a first location may include operation of acquiring a first location through at least a portion (e.g., a header) of data corresponding to the first image.

According to various example embodiments, operation of determining of a first location may include operation of determining a location of the electronic device in which the first image is acquired to the first location.

According to various example embodiments, operation of determining of moving information may include operation of acquiring information of at least one of a distance or an angle between the first location and the second location or a direction from the first location to the second location as the moving information.

According to various example embodiments, operation of determining the moving information may include operation of acquiring the step number of a user of the electronic device as the moving information.

According to various example embodiments, operation of automatically acquiring of a second image may include operation of acquiring the second image including a portion of the first image.

According to various example embodiments, operation of automatically acquiring of a second image may include operation of acquiring the second image based on information of at least one of a time in which the electronic device is located at the second location, shaking, or a slope of the electronic device.

According to various example embodiments, a method of acquiring an image in the electronic device may further include operation of outputting guide information corresponding to a difference between the moving information and the specified range, when the moving information belongs to a range different from the specified range.

According to various example embodiments, a method of acquiring an image in the electronic device may further include operation of generating a map including first location information corresponding to the first location and second location information corresponding to the second location based on at least a portion of the first image and at least a portion of the second image.

According to various example embodiments, operation of generating the map may include operation of generating a map including direction information about a first direction corresponding to at least a portion of the first image and a second direction corresponding to at least a portion of the second image.

According to various example embodiments, operation of generating of a map may include operation of generating a third image corresponding to a third location between the first location and the second location using at least a portion of the first image and at least a portion of the second image.

According to various example embodiments, operation of generating the map may include operation of outputting map information corresponding to the map.

According to various example embodiments, a method of acquiring an image in the electronic device may include operation of reproducing at least a portion of the first image in relation to the first location information and reproducing at least a portion of the second image in relation to the second location information. According to an example embodiment, the method may further include operation of sequentially reproducing each of at least a portion of the first image and at least a portion of the second image in relation to the first location information or the second location information.

Figure 15:
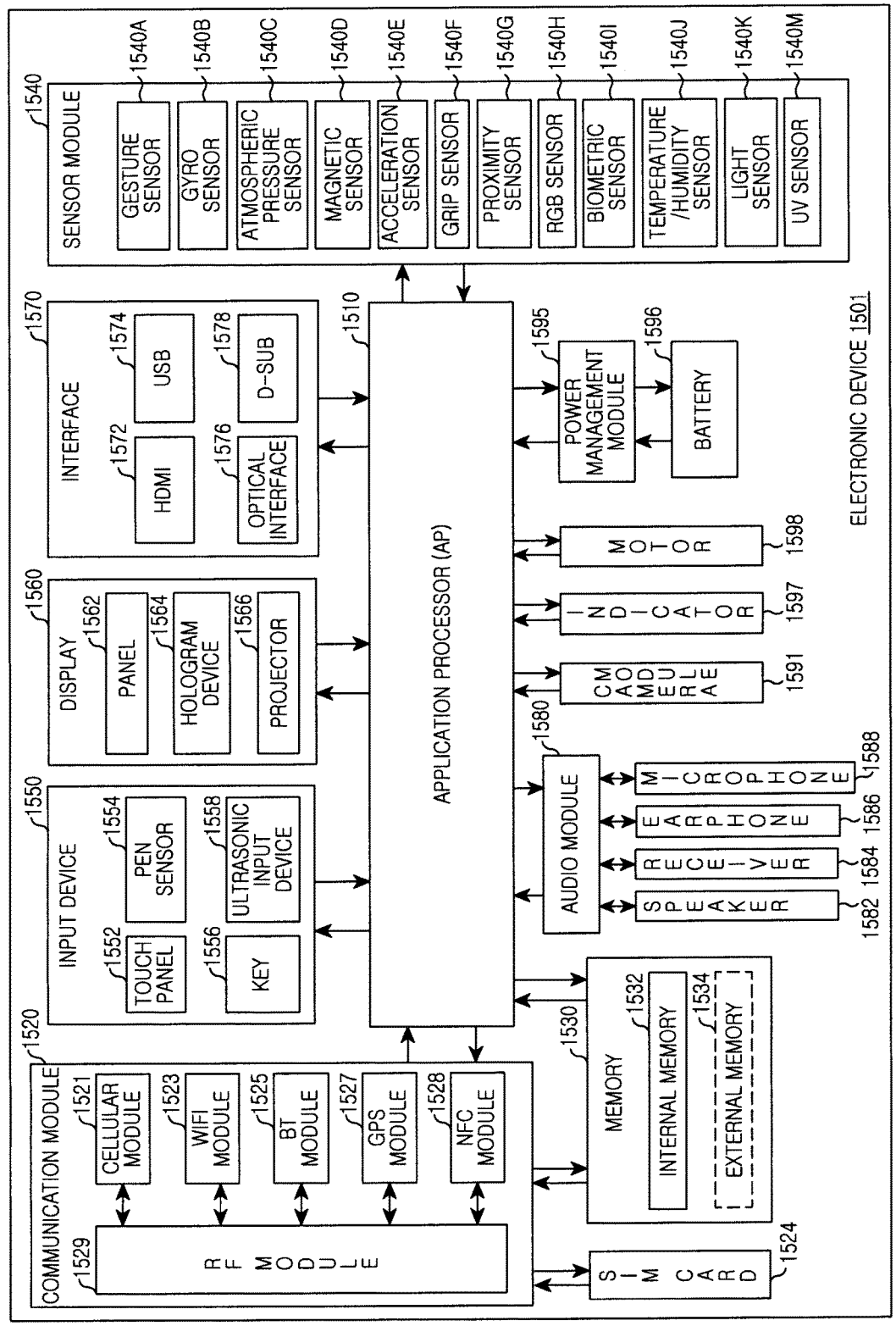
FIG. 15 is a block diagram illustrating a configuration of an electronic device according to various example embodiments of the present disclosure.

FIG. 15 is a block diagram 1500 illustrating an electronic device 1501 according to various example embodiments of the present disclosure.

The electronic device 1501 may be, for example, the entire or a portion of the electronic device 101 of FIG. 1. Referring to FIG. 15, the electronic device 1501 may include at least one Application Processor (AP) 1510, a communication module 1520, a Subscriber Identification Module (SIM) card 1524, a memory 1530, a sensor module 1540, an input device 1550, a display 1560, an interface 1570, an audio module 1580, a camera module 1591, a power management module 1595, a battery 1596, an indicator 1597, and a motor 1598.

The AP 1510 may drive an operation system or an application program to control a plurality of hardware or software components connected to the AP 1510 and perform various data processing and operations including multimedia data. The AP 1510 may be implemented with, for example, a System on Chip (SoC). According to an example embodiment, the AP 1510 may further include a Graphic Processing Unit (GPU) (not shown).

The communication module 1520 (e.g., the communication interface 160) may perform data transmitting and reception in communication between other electronic devices (e.g., the electronic device 104 or the server 106) connected to the electronic device 1501 (e.g., the electronic device 101) through a network. According to an example embodiment, the communication module 1520 may include a cellular module 1521, a WiFi module 1523, a BT module 1525, a GPS module 1527, an NFC module 1528, and a Radio Frequency (RF) module 1529.

The cellular module 1521 may provide audio dedicated communication, audiovisual communication, a text message service, or an Internet service through a communication network (e.g., LTE, LTE-A, CDMA, WCDMA, UMTS, WiBro, or GSM). Further, the cellular module 1521 may perform identification and authentication of an electronic device within a communication network using, for example, a subscriber identity module (e.g., the SIM card 1524). According to an example embodiment, the cellular module 1521 may perform at least a partial function of functions in which the AP 1510 may provide. For example, the cellular module 1521 may perform at least a portion of a multimedia control function.

According to an example embodiment, the cellular module 1521 may include a Communication Processor (CP). Further, the cellular module 1521 may be implemented with, for example, a SoC. In FIG. 15, elements such as the cellular module 1521 (e.g., a communication processor), the memory 1530, or the power management module 1595 are an element separate from the AP 1510, but according to an example embodiment, the AP 1510 may include at least a portion (e.g., the cellular module 1521) of the foregoing elements.

According to an example embodiment, the AP 1510 or the cellular module 1521 (e.g., a communication processor) may load and process an instruction or data received from a nonvolatile memory connected thereto or at least one of other elements in a volatile memory. Further, the AP 1510 or the cellular module 1521 may store data received from at least one of other elements or generated by at least one of other elements at a non-volatile memory.

The WiFi module 1523, the BT module 1525, the GPS module 1527, or the NFC module 1528 each may include a processor for processing data transmitted and received through, for example, a corresponding module. In FIG. 15, the cellular module 1521, the WiFi module 1523, the BT module 1525, the GPS module 1527, or the NFC module 1528 each is described as a separate block, but according to an example embodiment, at least a portion (e.g., at least two) of the cellular module 1521, the WiFi module 1523, the BT module 1525, the GPS module 1527, or the NFC module 1528 may be included within an integrated chip (IC) or an IC package. For example, at least a portion (e.g., a communication processor corresponding to the cellular module 1521 and a WiFi processor corresponding to the WiFi module 1523) of processors corresponding to each of the cellular module 1521, the WiFi module 1523, the BT module 1525, the GPS module 1527, or the NFC module 1528 may be implemented with a SoC.

The RF module 1529 may perform transmission and reception of data, for example, transmission and reception of an RF signal. Although not shown, the RF module 1529 may include, for example, a transceiver, a Power Amp Module (PAM), a frequency filter, or a Low Noise Amplifier (LNA). Further, the RF module 1529 may further include a component, for example, a conductor or a conductive wire that transmits and receives electromagnetic waves on free space in wireless communication. In FIG. 15, the cellular module 1521, the WiFi module 1523, the BT module 1525, the GPS module 1527, and the NFC module 1528 share an RF module 1529, but according to an example embodiment, at least one of the cellular module 1521, the WiFi module 1523, the BT module 1525, the GPS module 1527, or the NFC module 1528 may perform transmission and reception of an RF signal through a separate RF module.

The SIM card 1524 may be a card including a subscriber identification module and may be inserted into a slot formed at a specific location of the electronic device. The SIM card 1524 may include intrinsic identification information (e.g., Integrated Circuit Card Identifier (ICCID)) or subscriber information (e.g., International Mobile Subscriber Identity (IMSI)).

The memory 1530 (e.g., the memory 130) may include an internal memory 1532 or an external memory 1534. The internal memory 1532 may include at least one of, for example, a volatile memory (e.g., a Dynamic RAM (DRAM), a Static RAM (SRAM), a Synchronous Dynamic RAM (SDRAM)) or a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, and a NOR flash memory).

According to an example embodiment, the internal memory 1532 may be a Solid State Drive (SSD). The external memory 1534 may further include a flash drive, for example, a Compact Flash (CF), Secure Digital (SD), Micro Secure Digital (Micro-SD), Mini Secure Digital (Mini-SD), extreme Digital (xD), or a memory stick. The external memory 1534 may be functionally connected to the electronic device 1501 through various interfaces. According to an example embodiment, the electronic device 1501 may further include a storage device (or storage medium) such as a hard drive.

The sensor module 1540 may measure a physical quantity or detect an operation state of the electronic device 1501 and convert measured or detected information to an electric signal. The sensor module 1540 may include at least one of, for example, a gesture sensor 1540A, a gyro sensor 1540B, an atmospheric pressure sensor 1540C, a magnetic sensor 1540D, an acceleration sensor 1540E, a grip sensor 1540F, a proximity sensor 1540G, a color sensor 1540H (e.g., Red, Green, and Blue (RGB) sensor), a bio sensor 1540I, a temperature/humidity sensor 1540J, an illumination sensor 1540K, or an Ultra Violet (UV) sensor 1540M. Additionally or alternatively, the sensor module 1540 may include, for example, an E-nose sensor (not shown), an electromyography sensor (EMG sensor) (not shown), an electroencephalogram sensor (EEG sensor) (not shown), an electrocardiogram sensor (ECG sensor) (not shown), an Infrared (IR) sensor (not shown), an iris sensor (not shown), or a fingerprint sensor (not shown). The sensor module 1540 may further include a control circuit that controls at least one sensor belonging to the inside thereof.

The input device 1550 may include a touch panel 1552, a (digital) pen sensor 1554, a key 1556, or an ultrasonic wave input device 1558. The touch panel 1552 may recognize a touch input with at least one method of, for example, a capacitive, resistive, infrared ray, or ultrasonic wave method. Further, the touch panel 1552 may further include a control circuit. When the touch panel 1552 is a capacitive type touch panel, the touch panel 1552 may perform a physical contact or proximity recognition. The touch panel 1552 may further include a tactile layer. In this case, the touch panel 1552 may provide a haptic reaction to the user.

The (digital) pen sensor 1554 may be implemented using the same method as and a method similar to, for example, reception of a touch input of the user or a separate recognition sheet. The key 1556 may include, for example, a physical button, an optical key, or a keypad. The ultrasonic wave input device 1558 may determine data by detecting a sound wave with a microphone (e.g., a microphone 1588) in the electronic device 1501 through an input instrument that generates an ultrasonic wave signal and may perform wireless recognition. According to an example embodiment, the electronic device 1501 may receive a user input from an external device (e.g., a computer or a server) connected to the communication module 1520 using the communication module 1520.

The display 1560 (e.g., the display 150) may include a panel 1562, a hologram device 1564, or a projector 1566. The panel 1562 may be, for example, a Liquid Crystal Display (LCD) or an Active-Matrix Organic Light-Emitting Diode (AM-OLED). The panel 1562 may be implemented with, for example, a flexible, transparent, or wearable method. The panel 1562 and the touch panel 1552 may be formed in a module. The hologram device 1564 may show a stereoscopic image in the air using interference of light. The projector 1566 may project light on a screen to display an image. The screen may be located, for example, at the inside or the outside of the electronic device 1501. According to an example embodiment, the display 1560 may further include a control circuit that controls the panel 1562, the hologram device 1564, or the projector 1566.

The interface 1570 may include, for example, a High-Definition Multimedia Interface (HDMI) 1572, a Universal Serial Bus (USB) 1574, an optical interface 1576, or D-sub-miniature (D-sub) 1578. The interface 1570 may be included in, for example, the communication interface 160 of FIG. 1. Additionally or alternatively, the interface 1570 may include, for example, a Mobile High-definition Link (MHL) interface, a Secure Digital (SD) card/Multi-Media Card (MMC) interface, or an Infrared Data Association (IrDA) specification interface.

The audio module 1580 may interactively convert a sound and an electronic signal. At least a partial element of the audio module 1580 may be included in, for example, the input and output interface 140 of FIG. 1. The audio module 1580 may process sound information that is input or output through, for example, a speaker 1582, a receiver 1584, an earphone 1586, or a microphone 1588.

The camera module 1591 may photograph a still picture and a moving picture, and according to an example embodiment, the camera module 1591 may include at least one image sensor (e.g., a front surface lens or a rear surface lens), a lens (not shown), an Image Signal Processor (ISP) (not shown), or a flash (not shown) (e.g., a Light Emitting diode (LED) or a xenon lamp).

The power management module 1595 may manage power of the electronic device 1501. Although not shown, the power management module 1595 may include, for example, a Power Management Integrated Circuit (PMIC), a charger Integrated Circuit (charge IC), a battery, or a fuel gauge.

The PMIC may be mounted within, for example, an IC or a SoC semiconductor. A charging method may be classified into a wired method and a wireless method. The charge IC may charge a battery and prevent an overvoltage or an overcurrent from being injected from a charger. According to an example embodiment, the charge IC may include a charge IC for at least one of a wired charge method and a wireless charge method. The wireless charge method may include, for example, a magnetic resonance method, a magnetic induction method, or an electromagnetic wave method and may add an additional circuit, for example, a circuit such as a coil loop, a resonant circuit, and a rectifier for wireless charge.

The battery gauge may measure, for example, a residual quantity of the battery 1596, a voltage, a current, or a temperature while charging. The battery 1596 may store or generate electricity and supply power to the electronic device 1501 using the stored or generated electricity. The battery 1596 may include, for example, a rechargeable battery or a solar battery.

The indicator 1597 may display a specific state, for example, a booting state, a message state, or a charge state of the electronic device 1501 or a portion (e.g., the AP 1510) thereof. The motor 1598 may convert an electrical signal to a mechanical vibration. Although not shown, the electronic device 1501 may include a processing device (e.g., GPU) for supporting a mobile TV. The processing device for supporting the mobile TV may process media data according to a specification such as Digital Multimedia Broadcasting (DMB), Digital Video Broadcasting (DVB), or media flow.

The foregoing elements of an electronic device according to the present disclosure may each be formed with at least one component, and a name of a corresponding element may be changed according to a kind of the electronic device. The electronic device according to the present disclosure may include at least one of the foregoing elements and may omit some elements or may further include additional other elements. Further, as some of elements of an electronic device according to the present disclosure are coupled to form an entity, the entity may equally perform a function of corresponding elements before coupling.

A term "module" used in the present disclosure may indicate a unit including a combination of at least one of, for example, hardware, software, or firmware. The "module" may be interchangeably used with a term such as a unit, logic, a logical block, a component, or a circuit. The "module" may be a minimum unit of an integrally formed component or a portion thereof. The "module" may be a minimum unit that performs at least one function or a portion thereof. The "module" may be mechanically or electronically implemented. For example, a "module" according to the present disclosure may include at least one of an Application-Specific Integrated Circuit (ASIC) chip, Field-Programmable Gate Arrays (FPGAs), or a programmable-logic device that performs any operation known or to be developed.

According to various example embodiments, at least a portion of a method (e.g., operations) or a device (e.g., modules or functions thereof) according to the present disclosure may be implemented with an instruction stored at computer-readable storage media in a form of, for example, a programming module. When the instruction is executed by at least one processor (e.g., the processor 120), the at least one processor may perform a function corresponding to the instruction. The computer-readable storage media may be, for example, the memory 130. At least a portion of the programming module may be implemented (e.g., executed) by, for example, the processor 120. At least a portion of the programming module may include, for example, a module, a program, a routine, sets of instructions, or a process for performing at least one function.

The computer-readable storage media may include magnetic media such as a hard disk, a floppy disk, and a magnetic tape, optical media such as a Compact Disc Read Only memory (CD-ROM) and a Digital Versatile Disc (DVD), magneto-optical media such as a floptical disk, and a hardware device, specially formed to store and perform a program instruction (e.g., a programming module), such as a Read Only memory (ROM), a Random Access memory (RAM), and a flash memory. Further, a program instruction may include a high-level language code that may be executed by a computer using an interpreter as well as a machine language code generated by a compiler. In order to perform operation of the present disclosure, the above-described hardware device may be formed to operate as at least one software module, and vice versa.

A module or a programming module according to the present disclosure may include at least one of the foregoing elements, may omit some elements, or may further include additional other elements. Operations performed by a module, a programming module, or another element according to the present disclosure may be executed with a sequential, parallel, repeated, or heuristic method. Further, some operations may be executed in different orders, may be omitted, or may add other operations.

According to various example embodiments, in a storage medium that stores instructions, when being executed by at least one processor, the instructions are set the at least one processor to perform at least one operation, the at least one operation may include operation of determining a first location corresponding to a first image stored at an electronic device, operation of determining moving information from the first location to a second location of the electronic device, and operation of automatically acquiring a second image corresponding to the second location, when the moving information belongs to a specified range.

A method and device for acquiring an image of an electronic device according to various example embodiments of the present disclosure can automatically acquire an image, for example, even if a user's additional input does not exist based on moving information and thus when the user acquires an image, enhanced convenience can be provided.

A method and device for acquiring an image of an electronic device according to various example embodiments of the present disclosure acquire an image, for example, when moving information corresponds to a specified range, and by preventing a situation that acquires an unnecessarily image, power consumption of the electronic device can be reduced.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" constitute hardware in the claimed disclosure. Under the broadest reasonable interpretation, the appended claims constitute statutory subject matter in compliance with 35 U.S.C. §101.

While the present disclosure has been particularly shown and described with reference to example embodiments thereof, it will be understood by those skilled in the art that various changes in form and details may be made therein without departing from the ambit of the present disclosure as defined by the appended claims.

What is claimed is:

1. A method of an electronic device, the method comprising:
   capturing a first image;
   identifying a first location in which the first image is captured;
   based on the identifying the first location, determining a second location for capturing a second image which has an overlap area overlapped with a portion of the first image, wherein the first image and the second image are used for generating a 3 dimensions (3D) image;
   detecting a change of a location of the electronic device;
   while the detecting, determining whether the location of the electronic device corresponds to the second location;
   upon receiving an input for capturing the second image in a state where the location of the electronic device does not correspond to the second location, displaying guidance information superimposed on a preview image for the second image, wherein the guidance information indicates a movement of the electronic device required for moving the electronic device to the second location;
   upon receiving the input in another state where the location corresponds to the second location, capturing the second image;
   in response to the capturing the second image, generating the 3D image based on at least in part on the first image and the second image; and
   in response to detecting an input for reproducing the 3D image, displaying, while reproducing the 3D image, a map over the 3D image, wherein the map includes a first object for indicating the first location, a second object for indicating the second location, and a third object for indicating a path from the first location and the second location.

2. The method of claim 1, wherein the first object includes an indication for indicating a direction from the first location to the second location.

3. The method of claim 1, further comprising:
receiving a third image indicating the third location from another electronic device; and
based on a third location on the third image, generating the 3D image comprising another object for indicating the third location.

4. The method of claim 1, further comprising:
upon the receiving the input in the another state where the location corresponds to the second location, identifying that the electronic device is located in the second location during a designated time; and
in response to the identifying, capturing the second image.

5. The method of claim 1, further comprising:
upon the receiving the input in the another state where the location correspond to the second location, identifying that a slope of the electronic device corresponds to a designated angle range; and
in response to the identifying,
capturing the second image.

6. The method of claim 1, wherein the first object indicates a time when the first image is captured, and
wherein the second object indicates a time when the second image is captured.

7. The method of claim 1, further comprising:
if the 3D image comprises a third image indicating the third location, identifying a first direction from the first image to the second image and a second direction from the second image to the third image; and
based on the first direction corresponds to the second direction, displaying, within the 3D image, the first object without the second object.

8. The method of claim 1, wherein the guidance information indicates at least one of a change of the location of the electronic device required for generating the 3D image or a change of an orientation of the electronic device required for generating the 3D image.

9. The method of claim 1, wherein the guidance information is displayed through at least one arrow indicating a direction.

10. The method of claim 1, wherein the first object and the second object are displayed on the third object.

11. An electronic device, comprising:
a screen;
a memory storing instructions; and
a processor, coupled to the screen and the memory, configured to execute the stored instructions to:
capture a first image;
identify a first location in which the first image is captured;
based on the identifying the first location, determine a second location for capturing a second image which has an overlap area overlapped with a portion of the first image, wherein the first image and the second image are used for generating a 3 dimensions (3D) image;
detect a change of a location of the electronic device;
while the detecting, determine whether the location of the electronic device corresponds to the second location;
upon receiving an input for capturing the second image in a state where the location of the electronic device does not correspond to the second location, display guidance information superimposed on a preview image for the second image, wherein the guidance information indicates a movement of the electronic device required for moving the electronic device to the second location;
upon receiving the input in another state where the location corresponds to the second location capturing the second image;
in response to the capturing the second image, generate the 3D image based at least in part on the first image and the second image; and
in response to detecting an input for reproducing the 3D image, display, while reproducing the 3D image, a map over the 3D image, wherein the map includes a first object for indicating the first location, a second object for indicating the second location, and a third object for indicating a path from the first location and the second location.

12. The electronic device of claim 11, wherein the first object includes an indication for indicating a direction from the first location to the second location.

13. The electronic device of claim 11, wherein the processor is further configured to execute the stored instructions to:
receive a third image indicating the third location from another electronic device; and
based on a third location on the third image, generate the 3D image comprising another object for indicating the third location.

14. The electronic device of claim 11, wherein the processor is further configured to execute the stored instructions to:
upon the receiving the input in the another state where the location corresponds to the second location, identify that the electronic device is located in the second location during a designated time; and
in response to the identifying, capture the second image.

15. The electronic device of claim 11, wherein the processor is further configured to execute the stored instructions to:
upon the receiving the input in the another state where the location correspond to the second location, identify that a slope of the electronic device corresponds to a designated angle range; and
in response to the identifying, capture the second image.

16. The electronic device of claim 11, wherein the first object indicates a time when the first image is captured, and
wherein the second object indicates a time when the second image is captured.

17. The electronic device of claim 11, wherein the processor is further configured to execute the stored instructions to:
if the 3D image comprises a third image indicating the third location, identify a first direction from the first image to the second image and a second direction from the second image to the third image; and
based on the first direction corresponds to the second direction, display, within the 3D image, the first object without the second object.

18. The electronic device of claim 11, wherein the guidance information indicates at least one of a change of the location of the electronic device required for generating the 3D image or a change of an orientation of the electronic device required for generating the 3D image.

19. The electronic device of claim 11, wherein the first object and the second object are displayed on the third object.

20. A non-transitory computer readable storage medium one or more programs for executing an operation of:
capturing a first image;
identifying a first location in which the first image is captured;

based on the identifying the first location, determining a second location for capturing a second image which has an overlap area overlapped with a portion of the first image, wherein the first image and the second image are used for generating a 3 dimensions (3D) image;

detecting a change of a location of an electronic device;

while the detecting, determining whether the location of the electronic device corresponds to the second location; and upon receiving an input for capturing a second image in a state where the location of the electronic device does not correspond to the second location, displaying guidance information superimposed on a preview image for the second image, wherein the guidance information indicates a movement of the electronic device required for moving the electronic device to the second location;

upon receiving the input in another state where the location corresponds to the second location, capturing the second image; and in response to the capturing the second image, generating the 3D image based at least in part on the first image and the second image; and in response to detecting an input for reproducing the 3D image, displaying, while reproducing the 3D image, a map over the 3D image, wherein the map includes a first object for indicating the first location, a second object for indicating the second location, and a third object for indicating a path from the first location and the second location.

* * * * *